Nov. 30, 1943.                H. BANY ET AL                    2,335,631
                          ELECTRIC CONTROL SYSTEM
                            Filed Dec. 23, 1940
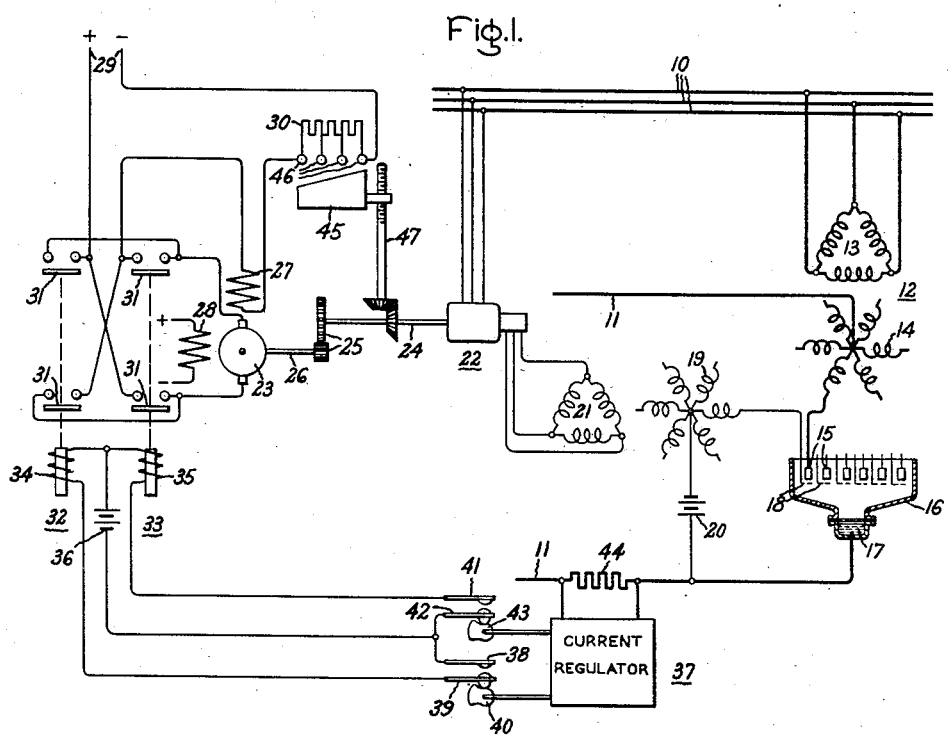
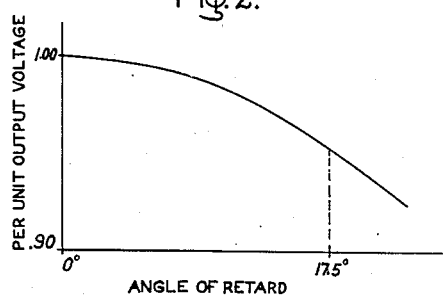
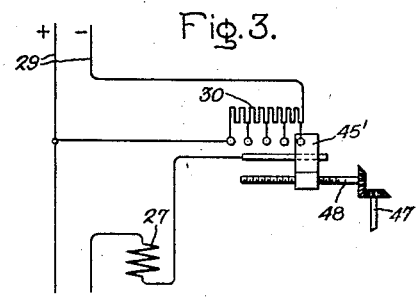
Inventors:
Herman Bany,
Richard H. Kaufmann,
by Harry E. Dunham
Their Attorney.

Patented Nov. 30, 1943

2,335,631

UNITED STATES PATENT OFFICE 2,335,631

ELECTRIC CONTROL SYSTEM

Herman Bany, Lansdowne, Pa., and Richard H. Kaufmann, Schenectady, N. Y., assignors to General Electric Company, a corporation of New York Application December 23, 1940, Serial No. 371,310

9 Claims. (Cl. 175—363)

Our invention relates to electric control systems and more particularly to electric control systems including electric discharge valves in which the position of a movable element is controlled in order to control an electrical condition of the associated circuits or electrical apparatus.

Heretofore, various arrangements have been provided for controlling a positionable element such as the movable element of a phase shifter to control an electrical condition of an electric circuit, such as one of the circuits interconnected by an electric valve converting system. These arrangements have had some disadvantages from the standpoint of the equipment required or the speed of response to a change in the controlled condition. According to the teachings of our invention, we provide a new and improved control system of the above type which is simple, fast acting, and in which a substantially linear relation is maintained between a controlling influence and the resulting controlling action of the control system.

It is an object of our invention to provide a new and improved control system.

It is another object of our invention to provide a new and improved control system for electric valve translating apparatus.

It is a further object of our invention to provide a new and improved regulating system for regulating an output condition of an electric valve translating system which is characterized by a uniformity of controlling action in response to a controlling influence over the full range of operation of the system.

In accordance with an illustrated embodiment of our invention the output current of an electric valve converting system is controlled by means of a phase shifter including a movable element which determines the phase relation of the excitation voltage applied to the control electrodes of the electric valve system with respect to voltage on the anodes. The position of the movable element of the phase shifter is controlled by a reversible direct current motor which is selectively energized for operation in either direction by a current regulator. The speed of operation of the direct current motor is varied in accordance with the position of the movable element of the phase shifter in order that the rate of change of output current or voltage of the rectifier may be maintained substantially constant regardless of the angle of retard of the excitation voltage supplied to the control members of the electric valve converting system. This is accomplished by varying the speed of operation of the motor which drives the movable element of the phase shifter in accordance with the position of the phase shifter by means of an impedance in the motor circuit which is varied automatically with the position of the movable element of the phase shifter. In a modification the motor is energized from a voltage divider which is controlled in accordance with the position of the phase shifter.

Our invention will be better understood by reference to the following description taken in connection with the accompanying drawing and its scope will be pointed out in the appended claims. In the drawing, Fig. 1 is a schematic representation of one embodiment of our invention, Fig. 2 illustrates certain operating characteristics of the system illustrated in Fig. 1, and Fig. 3 is a modification of a portion of the system illustrated in Fig. 1.

Referring now to the drawing, we have shown our invention embodied in a system including an electric valve converting system for controlling the transfer of energy between an alternating current supply circuit 10 and a direct current load circuit 11. The electric valve converting system includes a power transformer 12 having a delta-connected primary winding 13 energized from the alternating current supply circuit 10, and a secondary winding 14 having the end terminals thereof connected with the anodes 15 of a valve means 16. As illustrated, the valve means is of the type employing an ionizable medium, such as a gas or vapor, and comprising in addition to the anodes 15, a cathode 17 of conducting liquid and control members 18, one of which is associated with each of the anodes 15. It will be apparent to those skilled in the art that any other type of electric discharge valve well known in the art may be employed, such as the single anode, single cathode type with the type of control electrode illustrated or the types such as an immersion igniter control member. The direct current circuit is completed from the neutral terminal of the transformer winding 14 and the cathode 17 of the valve means 16. The conductivities of the electric discharge paths between the anodes 15 and the cathode 17 are controlled by the excitation voltages impressed on the control members 18 by the secondary winding 19 of an excitation transformer and a negative biasing battery 20. The primary winding 21 of the excitation transformer is energized from the winding of the movable element of a phase shifter 22, the stationary winding of which is energized from the alternating current supply circuit 10.

The secondary winding 19 of the excitation transformer is star connected and has the end terminals thereof each associated with one of the control members 18. The circuit from the control members to the cathode 17 of the valve means 16 is completed from the neutral terminal of the transformer winding 19 through the negative biasing battery 20.

As is well understood by those skilled in the art, the system thus far described may be operated to transfer energy from the alternating current circuit 10 to the direct current 11, and the magnitude of the voltage or current of the direct current circuit 11 may be controlled by controlling the time in the anode-cathode voltages of the valve means 16 at which the voltage impressed on the associated control members is sufficiently positive to render the discharge paths conductive. The time at which the discharge paths are rendered conductive may be varied by controlling the position of the movable element of the phase shifter 22 and in accordance with our invention we provide an improved arrangement for accomplishing this control in accordance with an electrical condition of the direct current circuit 11. In the arrangement illustrated, the movable element of phase shifter 22 is connected with a direct current motor 23 by means of a shaft 24, gearing 25 and shaft 26. The direct current motor 23 includes a series field winding 27 and a shunt field winding 28. The armature winding of the direct current motor 23 is arranged to be connected to a direct current source 29 through a tapped resistor 30 and the series field winding 27 by means of certain of the contacts 31 of the electromagnetic reversing switch means 32 and 33, each of which includes an operating coil designated by numerals 34 and 35, respectively. The shunt field winding 28 of the direct current motor may be energized from any suitable source of direct current voltage and may be energized from the direct current circuit 29. The contacts 31 of switching means 32 and 33 are normally biased to open position and are arranged to close when the operating coils 34 and 35, respectively, are energized. It is apparent from an inspection of the motor circuit that when the contacts of switching means 32 are closed, direct current voltage of one polarity is applied to the armature of the direct current machine 23, while if the contacts 31 of switching means 33 are closed a direct current voltage of opposite polarity is applied to the armature of the direct current motor 23. The operating coils 34 and 35 are connected to be energized from a suitable source of direct current such as the battery 36 under the control of a current regulating device illustrated generally by the numeral 37. The circuit of operating coil 34 of switching means 32 is completed from one terminal thereof, through battery 36 to the fixed contact 38 of the current regulator 37 and from the other terminal thereof to the movable contact 39 of regulator 37 which is controlled by a cam 40. Similarly, one terminal of operating coil 35 is connected to fixed contact 41 while the other terminal thereof is connected to movable contact 42 through a circuit including the battery 36. The circuit controlling position of contacts 38, 39 and 41, 42 is controlled by cam members 40 and 43. The controlling influence for controlling the operation of the current regulator 37, in the particular arrangement illustrated, is obtained from the potential drop across a resistor 44 in the direct current circuit 11. When the current flowing in direct current circuit 11 is of the value for which the regulator is set, the cam members 40 and 43 are stationary and neither of the operating coils 34 or 35 is energized. The particular form of the regulator illustrated schematically by numeral 37, which is employed to control the energization of the operating coils 34 and 35 of the switching means 32 and 33, is not important to the present invention. Preferably it is of the type which operates to close the circuit of the motor 23 for a predetermined time in response to a controlling influence obtained from the circuit 11 by means of the resistor 44. In the particular arrangement illustrated, the cam means 40 and 43 have been illustrated as the means for controlling these coils, one of the cam means being rotated at constant speed for one revolution in response to a rise in the current of direct current circuit 11 from a predetermined value and the other of the cam means being operated at constant speed for one revolution in response to a lowering of the current in direct current circuit 11. Regulators of this general type are well known to those skilled in the art. In order that the speed of rotation of the motor 23 and consequently the rate at which the movable element of the phase shifter 22 is moved may be controlled, we provide switching means for controlling the portion of resistor 30 which is connected in circuit with the source of direct current voltage 29 and the direct current motor 23 in accordance with the position of the movable element of the phase shifter 22. In the particular arrangement illustrated, this switching means comprises a member 45 of conducting material which is arranged to successively engage the contacts 46 associated with the tapped resistor under the control of the threaded shaft 47 which is geared to the shaft 24 of the phase shifter 22. It is understood that member 45 is suitably insulated from the shaft 47.

The features and advantages of our invention will become more apparent from a consideration of the operation of the embodiment thereof just described, together with the operating characteristics of an electric valve rectifier illustrated in Fig. 2, in which the per unit output voltage is plotted against the angle of retard of the excitation voltage applied to the control members thereof. As is readily seen from Fig. 2, the graph of the per unit output voltage versus angle of retard of the control member excitation voltage is substantially a cosine wave. This means that in order to produce a given change in output voltage a greater movement of the phase shifter is required when the valves are conducting through the full period of the positive half-wave of the anode-cathode voltage wave than when the excitation voltage wave is substantially retarded with respect to the anode-cathode voltage. For this reason, we provide an arrangement in which the motor driving the movable element of the phase shifter operates at its highest speed when the excitation voltage of the control member is such as to render the discharge paths conductive for a period which coincides substantially with the positive half-wave of the anode-cathode voltage and in which the motor speed decreases as the excitation voltage is retarded. In the particular arrangement illustrated, the electric valve system may be operated with an angle of retard in time of firing of the discharge paths varying between zero and seventeen and one-half degrees, for example, and with the tapped resistor arrangement providing four different speeds of the driving motor over this range. It is apparent that more than four taps on the resistor, or a resistor arrangement in which the magnitude of the resistance included in the motor circuit is continually varied in response to the position of the movable element of the phase shifter could be utilized if desired. In this way the rate of change of the angle of retard of the excitation voltage may be varied to compensate for the nonlinearity between the rectifier output voltage and the angle of retard of the excitation voltage.

In Fig. 3 is illustrated a modification of a portion of the system shown in Fig. 1. In the arrangement shown in Fig. 3 the resistor 30 is connected across the source 29 to provide a variable voltage direct current supply for the reversible driving motor 23. The magnitude of the voltage impressed on the motor circuit is controlled in accordance with the position of the movable element of the phase shifter by means of the movable contact member 45' which is operated from shaft 47 by means of a shaft 48. With the contact member 45' in the position shown the full voltage of the direct current source 29 is supplied to the motor 23 and corresponds to the condition of the circuit of Fig. 1 when the series resistor is entirely out of the circuit or when the movable member 45 short circuits all of the terminals 46. The arrangement shown in Fig. 3 employing the potentiometer provides a direct current voltage which has a smaller variation between the stalled condition and the running condition of motor 23 than the arrangement of Fig. 1 in which a series resistor is employed.

The arrangements of our invention are particularly advantageous when used with the type of regulator which completes the motor circuit for a predetermined interval for each controlling influence, since with this type of regulator it is desirable to obtain the same rate of correction in the output voltage during each interval that the motor is energized. The arrangement is also relatively simple and rapid in response.

While we have shown and described a particular embodiment of our invention, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a supply circuit, a load circuit, at least one of said circuits being an alternating current circuit, electric translating apparatus connected between said circuits and comprising electric valve means of the type having a control member for controlling the conductivity thereof, means for impressing on said control member an alternating voltage of variable phase displacement relative to the voltage of said alternating current circuit and comprising a phase shifting means having a movable member, motor means for positioning said movable member, and means operatively associated with said movable member and movable therewith for modifying the speed of operation of said motor means.

2. In combination, an alternating current circuit, a load circuit, electric translating apparatus connected between said circuits and comprising electric valve means of the type having a control member for controlling the conductivity thereof, means for impressing on said control member an alternating voltage of variable phase displacement relative to the voltage of said alternating current circuit and comprising a phase shifting device having a movable member, motor means for positioning said movable member, and means responsive to the position of said movable member for controlling the speed of rotation of said motor means.

3. In combination, an alternating current circuit, a load circuit, electric translating apparatus connected between said circuits and comprising electric valve means of the type having a control member for controlling the conductivity thereof, means for impressing on said control member an alternating voltage of variable phase displacement relative to the voltage of said alternating current circuit and comprising a phase shifting device having a movable member, motor means for positioning said movable member, and means operatively connected with said movable member and movable therewith for controlling the voltage impressed on said motor in response to the position of said member.

4. In combination, an alternating current circuit, a load circuit, electric translating apparatus connected between said circuits and comprising electric valve means of the type having a control member for controlling the conductivity thereof, a source of direct current voltage, means for impressing on said control member an alternating voltage of variable phase displacement relative to the voltage of said alternating current circuit and comprising a phase shifting device having a movable member, a reversible direct current motor for positioning said movable member, impedance means connected between said motor and said source of direct current voltage, and means responsive to the position of said movable member for controlling the magnitude of said impedance in said motor circuit to control the rate of change of position of said movable member.

5. In combination, an alternating current circuit, a direct current circuit, electric translating apparatus connected between said circuits comprising an electric valve means having a control member for controlling the conductivity thereof, means for impressing on said control member a periodic voltage variable in phase with respect to the voltage of said alternating current circuit to maintain a predetermined characteristic of an electrical condition of one of said circuits and comprising a rotary phase shifter having relatively movable windings, means for positioning the movable winding of said rotary phase shifter comprising an electric motor, a source of voltage for energizing said motor, means for controlling the magnitude of the voltage impressed on said motor from said source, and means operatively associated with the movable winding of said phase shifter and movable therewith to control the operation of said last mentioned means.

6. An alternating current supply circuit, a direct current load circuit, electric translating apparatus interconnecting said circuits and comprising electric valve means of the type having a control member for controlling the conductivity thereof, means for impressing a periodic voltage on said control member, and means for controlling the phase position of said periodic voltage with respect to the voltage of said alternating current in accordance with an electrical condition of one of said circuits including electric motor means having a substantially unrestrained rotatable element, and means for varying the rate of rotation of said rotatable element in response to variations in the phase relation of said periodic voltage with respect to the voltage of said alternating current circuit to maintain a substantially constant rate of change of said electrical condition independently of the phase relation of said periodic voltage when said change is made.

7. In combination, a supply circuit, a load circuit, at least one of said circuits being an alternating circuit, electric translating apparatus connected between said circuits and comprising electric valve means of the type having a control member for controlling the conductivity thereof, means for impressing on said control member a periodic voltage of variable phase displacement relative to the voltage of said alternating current circuit to control an electrical condition of one of said circuits and comprising a phase shifting device having a rotatable element, a source of voltage, a reversible electric motor for positioning the movable element of said phase shifting device, means for selectively connecting said motor with said source of voltage for rotation in either direction for a predetermined time in response to variations in said electrical condition, and means for varying the rate of rotation of said motor to maintain a substantially constant rate of change of said electrical condition independently of the position of the movable element of said phase shifting device.

8. In combination, an alternating current supply circuit, a direct current load circuit, electric translating apparatus interconnecting said circuits and comprising electric valve means of the type having a control member for controlling the conductivity thereof, means for impressing on said control member an alternating voltage of variable phase displacement relative to the voltage of said alternating current circuit and comprising a phase shifter of the rotary type having relatively movable windings, electric motor means energized in response to a controlling influence derived from one of said circuits for rotating one of said relatively movable windings in one direction for a predetermined time in response to each controlling influence, and means controlled in response to the position of said relatively movable windings for controlling the rate of rotation of said motor to maintain a substantially constant rate of change in said electrical condition throughout the operating range of movement of said movable element of said phase shifter.

9. In combination, an alternating current supply circuit, a direct current load circuit, electric translating apparatus connected between said circuits and comprising electric valve means of the type having a control member for controlling the conductivity thereof, means for impressing on said control member an alternating voltage of variable phase displacement relative to the voltage of said alternating current circuit to control an electrical condition of said load circuit and comprising a phase shifting device having a movable winding, a source of direct current voltage, a reversible direct current motor for positioning said winding, and means responsive to an electrical condition of said load circuit for selectively connecting said motor with said source of direct current voltage for rotation in either direction for a predetermined time in response to a change in said electrical condition, means associated with said source of direct current voltage for controlling the magnitude of the voltage impressed on said motor, and switching means responsive to the position of the movable winding of said phase shifting device for controlling the operation of said last mentioned means to maintain a substantially constant rate of change of said electrical condition throughout the operating range of the movable winding of said phase shifting device.

HERMAN BANY.
RICHARD H. KAUFMANN.